United States Patent [19]

Yui et al.

[11] Patent Number: 4,873,282

[45] Date of Patent: Oct. 10, 1989

[54] POLYACETAL RESIN COMPOSITION

[75] Inventors: Hiroshi Yui; Michiya Okamura; Masakazu Ikeda; Norio Matsuo, all of Mie, Japan

[73] Assignee: Mitsubishi Petrochemical Co., Ltd., Tokyo, Japan

[21] Appl. No.: 187,843

[22] Filed: Apr. 29, 1988

[30] Foreign Application Priority Data

May 15, 1987 [JP] Japan ................................. 62-118168
May 15, 1987 [JP] Japan ................................. 62-118169

[51] Int. Cl.$^4$ .......................... C08L 59/00; C08K 3/04
[52] U.S. Cl. ..................................... 524/496; 524/512; 523/222; 523/351; 525/154
[58] Field of Search ................ 524/496, 512; 525/154; 523/222, 351

[56] References Cited

U.S. PATENT DOCUMENTS

| 3,377,313 | 4/1968 | Jupa | 524/496 |
| 3,969,313 | 7/1976 | Aishima | 524/427 |
| 4,391,741 | 7/1983 | Masamoto | 260/DIG. 17 |
| 4,670,508 | 6/1987 | Ohdaira | 524/496 |

FOREIGN PATENT DOCUMENTS

| 0185543 | 6/1986 | European Pat. Off. |
| 2808675 | 9/1978 | Fed. Rep. of Germany. |
| 158643 | 12/1975 | Japan. |
| 037198 | 2/1988 | Japan. |
| 1060497 | 3/1967 | United Kingdom. |

OTHER PUBLICATIONS

Database WPI, No. 76-87888x, Derwent publ. Ltd., London,GB, & JP-A-51-114447 *abstract* (date unavailable).
Database WPIL, No. 84-060919, Derwent Publ Ltd., London GB, & Su-A-1014 843 *Abstract* (date unavailable).
Database WPIL, No. 88-087300, Derwent Publ. Ltd., London, GB & JP-A-63-17021988 *Abstract* (date unavailable).
Ritchie; *Platicizers, Stabilizers and Fillers;* 1972 pp. 265-266.

Primary Examiner—John C. Bleutge
Assistant Examiner—David Buttner
Attorney, Agent, or Firm—Oblon, Spivak, McClelland, Maier & Neustadt

[57] ABSTRACT

A polyacetal resin composition comprising a polyacetal, a polyolefin, and carbon black dispersed in a special morphology, which is excellent in thermal conductivity, sliding property, moldability, and molding appearance. The composition provides a sliding part for electrical equipments, e.g., gears, bearings, cams, etc., which has excellent sliding properties, makes low noise, and exhitits high abrasion resistance.

12 Claims, 3 Drawing Sheets

POLYACETAL RESIN COMPOSITION

FIELD OF THE INVENTION

This invention relates to a polyacetal resin composition comprising a polyacetal, a polyolefin, and particularly high-density polyethylene, and carbon black dispersed in a special morphology, which is excellent in thermal conductivity, sliding property, moldability, and molding appearance.

BACKGROUND OF THE INVENTION

In recent years, plastics have been widespread in the fields of various domestic appliances, office automation equipments, etc. with the improvement of accuracy and properties due to the development of molding techniques, new plastic materials, and the like.

Upon a particular consideration of gears that are sliding parts of these equipments, plastics are widely employed chiefly as gears of small transmission torque or small-sized gears from the standpoint of decreased cost resulted from mass production, corrosion resistance, reduced noise, and the like in spite of their inferiority in stiffness or strength.

Polyacetal resins have been generally used for the particular use as precise gear of small size because of their relatively well-balanced characteristics as required for gear materials, such as molding accuracy, fatigue strength, etc.

Polyacetal itself is an engineering resin excellent in sliding properties, and studies have been directed to broadening of utility of polyacetal by incorporating carbon black thereinto to thereby impart thermal conductivity.

However, a polyacetal composition having incorporated therein carbon black in an amount sufficient to obtain required properties has suffered many problems, such as decomposition of polyacetal during kneading, serious reduction in moldability, extreme deterioration in molding appearance, and the like.

In addition, the sliding part (e.g., gears) comprising a polyacetal resin makes a disturbing noise when used under severe conditions, i.e., a high load and a high speed.

With the strong demand for reduction of noise caused by various domestic appliances, office automation equipments, etc., it has been keenly demanded to improve molding accuracy, abrasion resistance, and sliding properties of sliding parts, e.g., gears, bearings, cams, etc.

In order to meet these requirements, it has been proposed to add an amide compound and polyethylene wax to polyacetal containing conductive carbon black as disclosed in U.S. Pat. No. 4,555,357. This proposal achieves some improvements on the above-described problems but still has another disadvantage that the sliding properties inherently possessed by polyacetal deteriorate.

SUMMARY OF THE INVENTION

In the light of these circumstances, the present inventors have conducted intensive and extensive investigations. As a result, it has now been found that a polyacetal resin composition in which polyacetal, carbon black, and a polyolefin are dispersed under a special morphological control is excellent in thermal conductivity, moldability, and molding appearance and superior to polyacetal itself in sliding properties.

That is, the present invention provides a polyacetal resin composition comprising (a) from 60 to 94 parts by weight of polyacetal, (b) from 4 to 30 parts by weight of a polyolefin, and (c) from 2 to 10 parts by weight of carbon black, each per 100 parts by weight of the total amount of the components (a), (b), and (c).

In a preferred embodiment of the aforesaid polyacetal resin composition, the component (c) is substantially included in a disperse phase of the component (b).

The present invention further provides a strikingly low-noise sliding part comprising the aforesaid polyacetal resin composition.

BRIEF DESCRIPTION OF THE ACCOMPANYING DRAWINGS

DETAILED DESCRIPTION OF THE INVENTION

Figure 1:
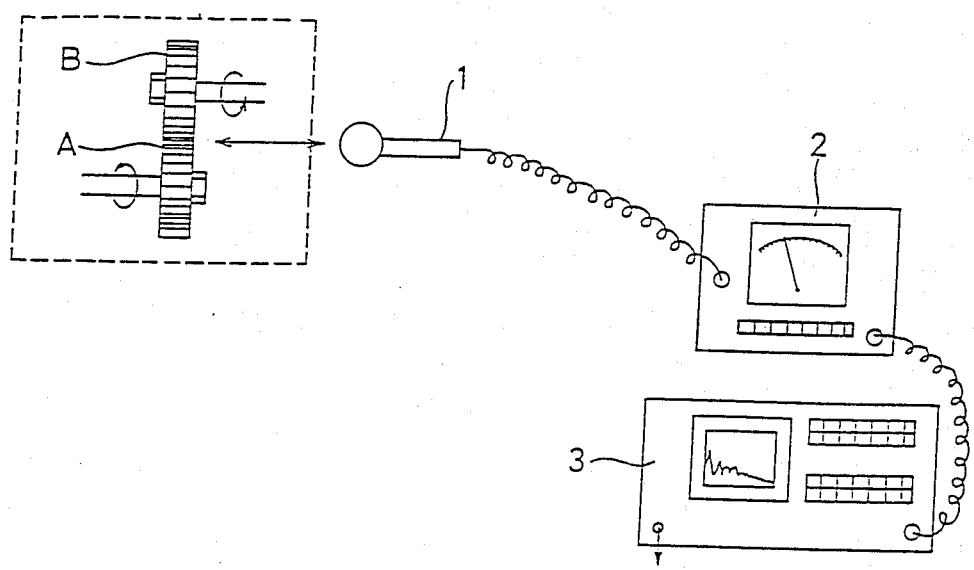
FIG. 1 illustrates a noise determination system.

The term "sliding part" as used herein means parts of electrical equipments undergoing sliding on driving and includes gears, bearings, cams, levers, etc.

The polyacetal which can be used as component (a) in the present invention is a polyoxymethylene homopolymer or a copolymer whose main chain comprises an oxymethylene unit. Polyoxymethylene homopolymer is a thermoplastic linear high polymer having a recurring unit structure represented by formula:

$-R\cdot CHO)_n$ wherein R represents a hydrogen atom or a methyl group, and includes an acetal homopolymer that is a uniform polymer of an aldehyde.

The acetal copolymer includes a polymer comprising an oxymethylene chain in which an oxyalkylene unit represented by formula:

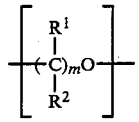

wherein $R^1$ and $R^2$, which may be the same or different, each represents a hydrogen atom, an alkyl group having from 1 to 5 carbon atoms, preferably 1 to 3 carbon atoms, or an aryl group; and m represents an integer of from 2 to 8, is incorporated at random.

The proportion of the oxyalkylene unit in the acetal copolymer generally ranges from 0.05 to 50 mols, and preferably from 0.1 to 20 mols, per 100 mols of the oxymethylene unit.

Specific examples of the oxyalkylene unit are an oxyethylene unit, an oxypropylene unit, an oxytrimethylene unit, an oxytetramethylene unit, an oxybutylene unit, and an oxyphenylethylene unit. Of these preferred are oxyethylene and oxytetramethylene units from the standpoint of improving properties of the polyacetal resin composition.

The above-described acetal copolymer can be prepared by copolymerizing or reacting formaldehyde, trioxane or polyoxymethylene with a cyclic ether or a cyclic formal.

In the present invention, the acetal homo- or copolymer produced by polymerization reaction is used as compounding component after its terminals are converted to stable groups.

The polyolefin which can be used as component (b) is a homopolymer of an olefin, and particularly α-olefin, inclusive of ethylene, or a copolymer of two or more kinds of α-olefins, such as a propylene polymer and an ethylene polymer.

The propylene polymer includes a propylene homopolymer; a random or block copolymer of propylene and one or more of other olefins, inclusive of ethylene; and polypropylene to which a vinyl monomer, e.g., acrylic acid, maleic anhydride, etc., is grafted. The copolymer of propylene and an α-olefin other than ethylene should contain at least 60% by weight of a propylene unit.

The ethylene polymer includes an ethylene homopolymer; a random or block copolymer of ethylene and one or more of other olefins; and a random, block or graft copolymer of ethylene and a vinyl monomer, e.g., acrylic acid, maleic anhydride, etc. The copolymer of ethylene and an α-olefin other than propylene should contain at least 60% by weight of an ethylene unit.

Specific examples of the polyolefin as the component (b) include α-olefin homopolymers, e.g., high-pressure-processed low-density polyethylene, medium to low-pressure-processed high-density polyethylene, straight-chain low-density polyethylene, polypropylene, polybutene, polyhexene, etc.; and copolymers of an α-olefin and other monomer(s), e.g., a random or block ethylene-propylene copolymer, an ethylene-vinyl acetate copolymer, a random or block propylene-ethylene copolymer, a propylene-ethylene-butene-1 terpolymer, a maleic anhydride-grafted polypropylene, etc.

Preferred of these polyolefins are an ethylene homopolymer and a copolymer of ethylene and other comonomer(s), which have a density between 0.92 g/cm$^3$ and 1.0 g/cm$^3$, and preferably between 0.945 g/cm$^3$ and 0.98 g/cm$^3$.

The comonomers copolymerizable with ethylene include olefins, e.g., propylene, butene, hexene, octene, etc., and vinyl compounds, e.g., vinyl acetate, (meth)acrylic acid, vinyl (meth)acrylate, etc.

The carbon black which can be used as component (c) is conventional and includes furnace black, acetylene black, thermal black, channel black, etc. It is preferable to use electrically conductive carbon black. Particularly advantageous is electrically conductive carbon black having a BET specific surface area (N$_2$ adsorption) of 40 m$^2$/g or more, preferably 400 m$^2$/g or more, and more preferably 850 m$^2$/g or more, e.g., Ketjen Black Produced by KBIC A.G.

The components (a), (b), and (c) are compounded at such ratios that the resulting composition contains from 60 to 94 parts, and preferably from 65 to 85 parts, by weight of the component (a), from 4 to 30 parts, and preferably from 10 to 25 parts, by weight of the component (b), and from 2 to 10 parts, and preferably from 4 to 8 parts, by weight of the component (c), each per 100 parts by weight of the total of the components (a), (b), and (c).

If the compounding ratio of the component (c) is less than 2 parts by weight, the resulting composition hardly shows thermal conductivity and enjoys only a poor effect of improving sliding properties. On the other hand, if it exceeds 10 parts by weight, moldability of the composition is deteriorated.

If the compounding ratio of the component (b) is less than 4 parts by weight, sliding properties cannot be improved sufficiently. If it exceeds 30 parts by weight, sliding properties are rather reduced.

When considering a dispersed system of the composition according to the present invention, it is particularly preferable that the component (c) is substantially included in a domain of the component (b). The phase "the component (c) is substantially included in a domain of the component (b)" as used herein means a morphological structure in which the component (c) is substantially embraced in the dispersed phase (domain) of the component (b) which substantially forms a continuous circuit through the composition. Formation of such morphology makes it possible to minutely control dispersion of carbon black and to markedly improve moldability and molding appearance. The substantial inclusion of carbon black in the continuous polyolefin circuit produces an additional effect that the resulting polyacetal resin composition exhibits improved electrical conductivity over the conventional polyacetal resin composition containing the same carbon black.

In order to form the above-mentioned special morphology, it is effective to properly control the melt viscosities of the compounds (a) and (b). More specifically, the morphology can be achieved by controlling a ratio of the melt flow rate (MFR) of the component (a) (X) to that of the component (b) (Y) [X/Y] within a range of from 0.2 to 30, preferably from 0.2 to 25, more preferably from 0.4 to 20, and particularly preferably from 0.5 to 15, the MFR being determined at 90° C. under a load of 2.16 kg. In this connection, it is preferable to use polyacetal, as component (a), having an MFR (X) of from 2 to 30 g/10 min, and more preferably from 5 to 20 g/10 min, and a polyolefin as component (b), having an MFR (Y) of from 0.08 to 10 g/10 min and more preferably from 2 to 8 g/10 min.

While the mode of blending the components (a), (b), and (c) is not particularly restricted, it is desirable that the components (b) and (c) are previously melt-kneaded and then the component (a) is melt-kneaded therewith.

The component (b) having dispersed therein the component (c) may be dispersed in the matrix component (a) in the form of spheres, or preferably in a fiber-like extended form or in the form of a network structure comprising fibrous particles connected among themselves.

The resin composition according to the present invention can contain various auxiliary components in addition to the essential components (a), (b), and (c). Examples of such auxiliary components include phenol type antioxidants, e.g., 2,6-di-t-butyl-4-methylphenol, 1,1,3-tri-(2-methyl-4-hydroxy-5-t-butylphenyl)butane, tetrakis[methylene(3,5-di-t-butyl-4-hydroxyhydrocinnamic ester)]methane, n-octadecyl-β-(4'-hydroxy-3',5'-di-t-butylphenyl)propionate, etc.; sulfur type antioxidants, e.g., dilauryl thiodipropionate, distearyl thiodipropionate, laurylstearyl thiodipropionate, tetrakis(-methylene-3-dodecyl thiopropionate)methane, etc.; phosphorus type antioxidants, e.g., di(dinonylphenyl)-mono-(p-nonylphenyl) phosphite, etc.; higher fatty acid metal salts, e.g., calcium stearate, magnesium stearate, zinc oleate, etc.; lubricants, e.g., stearamide, etc.; ultraviolet absorbents; antistatics; copper resistance agents; flame retardants; and the like.

Addition of these additive components are effective to improve various properties, such as a physical property balance, surface properties of a molding (e.g., scratch resistance, gloss, weld appearance, silver streaking, flow marks, etc.), printability, coating properties, adhesiveness, plating properties, moldability, durability, and the like. The above-enumerated auxiliary components may be used either individually or in combinations thereof.

If desired, the composition of the present invention can further contain inorganic fillers, e.g., calcium carbonate, talc, barium sulfate, mica, wollastonite, potassium titanate, carbon fiber, magnesium hydroxide, etc.

The resin composition of the present invention can be obtained by kneading the above-described components by the use of a batch mixer, e.g., a Banbury mixer, a roll, a Brabender Plastograph, etc., a single screw extruder, or a twin screw extruder.

The thus obtained polyacetal resin composition according to the present invention is markedly excellent in electrical conductivity, thermal conductivity, and sliding properties and also exhibits abrasion resistance and low noise making properties ascribed to the excellent sliding properties.

The morphology of the resin composition of the present invention was observed as follows. The composition in the form of pellets were injection molded to prepare a 2 mm thick sheet specimen. The sheet was cut into a thin slice across the resin flow direction by the use of a microtome, and a projected image of the sliced film was observed under a biological microscope. Further, a slice across the resin flow direction was cut out of the same specimen as prepared above by the use of a ultramicrotome and, after ion etching, the slice was scanned by means of a scanning electron microscope to observe a secondary electron image.

As described above, the polyacetal resin composition of the present invention is remarkably superior is electrical and thermal conductivity, apearance of moldings thereof, and sliding properties. Accordingly, the composition provides on molding sliding parts for appliances, such as gears, bearings, cams, etc., which have excellent sliding properties, make low noise, and have high abrasion resistance.

The present invention is now illustrated in greater detail with reference to Examples and Comparative Examples shown below, but it should be understood that the present invention is not limited thereto.

In these examples, various properties were determined according to the following test methods.

(1) Specific Volume Resistance:
Standard: According to SRIS 2301 of Nippon Rubber Institute (Wheatstone bridge method)
Specimen: Since the standard specimen is not limited in shape, an injection molding article of 2 cm in width, 8 cm in length, and 2 cm in thickness was used. For determination of resistance, a 5 mm wide area from the both ends (shorter edges) was coated with a conductive coating "Dotite type RA3", a trade name of a synthetic resin enamel coating produced by Fujikura Kasei Co., Ltd.; toluene content: 90 to 100%.

Measurement Condition:
Temperature: 21° to 23° C.
Humidity: 55 to 60% RH
Measurement was conducted after 24 hours from the application of the conductive coating.

(2) Thermal Conductivity:
Thermal conductivity was determined according to JIS C-2141 (laser flash method). That is, a specimen of 10 mm in diameter and 1 to 2 mm in thickness was irradiated with a laser beam, and an increase in temperature of the surface and back sides of the specimen and an absorbed energy on the surface of the specimen were measured. A thermal conductivity was calculated from equations (1) to (3):

$$\text{Thermal Diffusivity } (a) = 1.37 \frac{L^2}{\pi^2 t_{\frac{1}{2}}} \tag{1}$$

$$\text{Heat Capacity } (c \cdot d) = \frac{Qi}{L \cdot \Delta Tm} \tag{2}$$

$$\text{Thermal Conductivity} = a \cdot c \cdot d \tag{3}$$

wherein $\Delta Tm$ is the maximum increase temperature (K) of a back side of specimen, $t_{\frac{1}{2}}$ is called a half.time, which is the time (sec.) until the temperature of a back side of specimen is increased by one second of $\Delta Tm$, $Qi$ is an absorbed energy; $d$ is a density; and $L$ is a thickness of a specimen.

Figure 2:
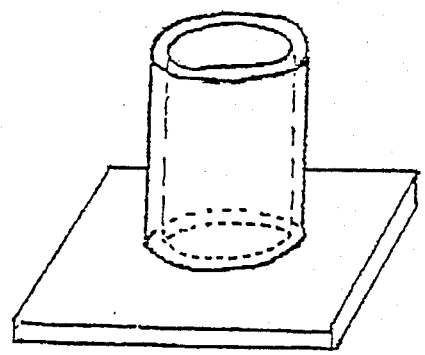
FIG. 2 illustrates a sliding property determination system.

(3) Sliding Properties (limit of PV):
As shown in FIG. 2, a cylinder obtained from the resin composition of the present invention (OD: 25.6 mm; ID: 20.0 mm; area of each end: 2.0 cm$^2$) was put on an ABS plate of 30 mm in width, 30 mm in length, and 2 mm in thickness, and the cylinder was rotated at an increasing peripheral speed starting at 17.3 cm/sec while being pressed onto the ABS plate under a constant contact pressure of 1 kg/cm$^2$. The contact surface between the ABS plate and the cyclinder was melted by a heat of friction to cause an abrupt increase in torque. The PV value at which the torque began to increase, i.e., a limit of PV (kg/cm$^2$.cm/sec=kg/cm.sec) was measured.

EXAMPLES 1 TO 4 AND COMPARATIVE EXAMPLES 1 TO 5

Polyacetal having an MFR of 9.0 g/10 min as component (a), high-density polyethylene A having a density of 0.963 g/m$^3$ and an MFR of 5.0 g/10 min or high-density polyethylene B having a density of 0.954 g/cm$^3$ and an MFR of 0.3 g/10 min as component (b), and carbon black having a specific surface area of 1050 m$^2$/g (Ketjen Black) or carbon black having a specific surface area of 80 m$^2$/g (acetylene black) as component (b) were mixed at a mixing ratio as shown in Table 1, and the mixture was kneaded in a twin screw extruder to obtain pellets.

The X/Y ratio in the case of using the high-density polyethylene A was 1.8, and that in the case of using the high-density polyethylene B was 30.

The pellets were molded in an injection molding machine to prepare test specimens for determination of various physical properties. The results of the determination are shown in Table 1.

TABLE 1

| | Example No. | | | | Comparative Example No. | | | | |
|---|---|---|---|---|---|---|---|---|---|
| | 1 | 2 | 3 | 4 | 1 | 2 | 3 | 4 | 5 |
| Composition (part by weight): | | | | | | | | | |
| (a) Polyacetal | 85 | 75 | 72 | 70 | 100 | 97 | 92 | 85 | 75 |
| (b) High-density polyethylene A | 12 | 20 | 20 | 20 | | | | | |
| (b) High-density polyethylene B | | | | | | | | 12 | 20 |
| (c) Ketjen black | 3 | 5 | 8 | | | 3 | 8 | 3 | 5 |
| (c) Acetylene black | | | | 10 | | | | | |
| Kneading Method* | A | B | B | B | — | C | C | A | B |
| Morphology** | A' | A' | A' | A' | — | — | — | B' | C' |
| Physical Properties: | | | | | | | | | |
| Moldability | excellent | excellent | good | good | — | slightly poor | poor | slightly poor | slightly poor |
| Appearance of Molding | excellent | excellent | good | good | — | slightly poor | poor | slightly poor | slightly poor |
| Specific Volume Resistance ($\Omega \cdot cm$) | $7.4 \times 10^3$ | $6.4 \times 10^1$ | $3.1 \times 10^0$ | $4.5 \times 10^3$ | $10^{14} <$ | $6.2 \times 10^{12}$ | $1 \times 10^2$ | $3 \times 10^6$ | $4 \times 10^3$ |
| Thermal Conductivity ($W/m \cdot K$) | 0.32 | 0.46 | 0.47 | 0.38 | 0.20 | 0.25 | 0.40 | 0.29 | 0.30 |
| Limit of PV | 95 | 90 | 86 | 73 | 35 | 30 | 20 | 40 | 50 |

Note:
*A: The components (a), (b), and (c) were simultaneously kneaded.
B: The components (b) and (c) were previously kneaded, and the component (a) was then kneaded therewith.
C: the components (a) and (c) were kneaded.
**A': The component (c) was dispersed in the dispersed phase of the component (b).
B': The component (c) was dispersed in the component (a).
C': the component (c) was dispersed in the components (a) and (b).

The results of Table 1 prove that the compositions according to the present invention are markedly superior to the comparative compositions in terms of electrical and thermal conductivity, sliding properties, moldability, and appearance.

EXAMPLE 5

Pellets of the resin composition were prepared in the same manner as in Example 3. The pellets were injection molded to obtain a precision gear having a diameter of 30 mm. Morphological analysis on the dispersed system of the molded gear revealed that the component (c) was substantially included in the domain of the component (b).

The resulting gear was tested for noise making property according to the method described below in comparison with a metal gear (made of "S45C") or polyacetal gear of the same size.

Gearwheels A and B as indicated in Table 2 were engaged with each other as illustrated in FIG. 1 and driven at a given rotation (700 rpm) and under a given load (torque: 20 kg.cm). The noise produced from the sliding gearwheels was determined by means of a microphone 1, a noise meter 2, and an FFT analyzer 3 to determine a nose level (dB). The results obtained are shown Table 2.

TABLE 2

| Combination of Gearwheels | | Noise Level | |
|---|---|---|---|
| Wheel A | Wheel B | (dB) | Remark |
| Gear of Invention | Metal gear | 83 | Invention |
| " | Polyacetal gear | 83 | " |
| " | Gear of Invention | 83 | " |
| Metal gear | Metal gear | 93 | Comparison |
| Polyacetal gear | " | 88 | " |
| " | Polyacetal gear | 88 | " |

As can be seen from Table 2, the special plastic gears according to the present invention make significantly reduced noise as compared with the metal gear or polyacetal gear.

Figure 3:
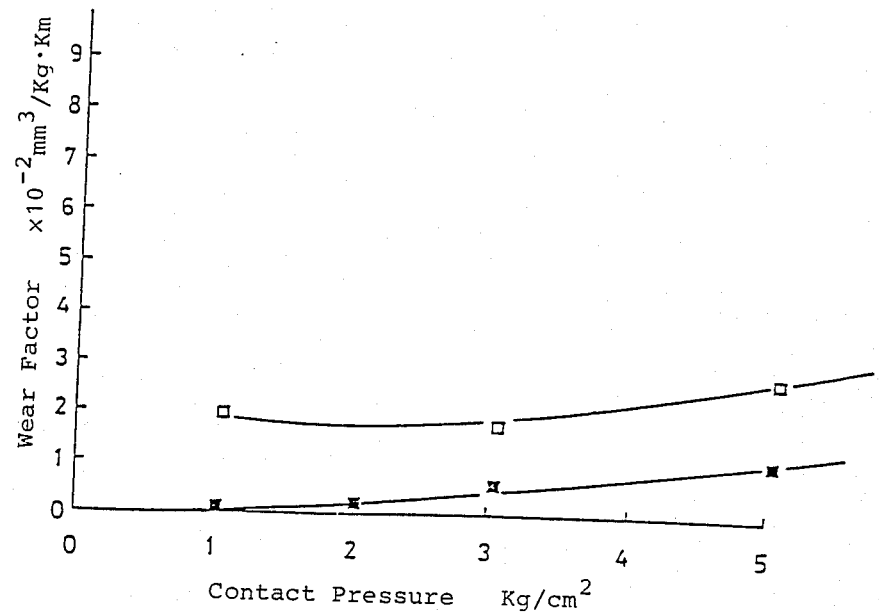
FIG. 3 is a graph showing the results of measurements of abrasion resistance.

Further, the pellets were molded into a plate. A rotating ring made of a steel was brought into contact with each of the above plate and a polyacetal plate under a prescribed contact pressure. The wear each of the plate of the present invention ( ) and the polyacetal plate ( ) on the sliding surface after 1 km running was measured. The results obtained are shown in the graph of FIG. 3.

While the invention has been described in detail and with reference to specific embodiments thereof, it will be apparent to one skilled in the art that various changes and modifications can be made therein without departing from the spirit and scope thereof.

What is claimed is:

1. A polyacetal resin composition, comprising: (a) from 60 to 94 parts by weight of a polyacetal, (b) from 4 to 30 parts by weight of an ethylene homopolymer or copolymer having a density of from 0.945 to 0.98 g/cm$^3$ and a melt flow rate of from 2 to 8 g/10 min, and (c) from 2 to 10 parts by weight of a carbon black selected from furnace black, acetylene black, thermal black and channel black, the amount of each component being based on 100 parts by weight of the total amount of components (a), (b), and (c) in the composition, the ratio of the melt flow rate of the poylacetal component (a) to component (b) ranging from 0.5 to 15.

2. The composition of claim 1, wherein carbon black component (c) is incorporated in the composition substantially by being dispersed in component (b).

3. The composition of claim 1, wherein the specific surface area of the carbon black component (c) is 400 m$^2$/g or more as measured by the BET method by nitrogen absorption.

4. The composition of claim 3, wherein said specific surface area is at least 850 m$^2$/g.

5. The composition of claim 1, wherein said components (a), (b) and (c) are present in amounts of from 65 to 85 parts by weight, from 10 to 25 parts by weight and from 4 to 8 parts by weight respectively, each per 100 parts by weight of the total amount of components in the composition.

6. The composition of claim 1, wherein component (b) is dispersed in component (a) in the form of spheres, in a fiber-like extended form or in the form of a network structure comprising fibrous particles connected among themselves.

7. A sliding object of an electric component, comprising:

a molding of specific shaped formed from a polyacetal resin composition comprising (a) from 60 to 94 parts by weight of a polyacetal, (b) from 4 to 30 parts by weight of an ethylene homopolymer or copolymer having a density of from 0.945 to 0.98 g/cm$^3$ and a melt flow rate of from 2 to 8 g/10 min, and (c) from 2 to 10 parts by weight of a carbon black, selected from furnace black, acetylene black, thermal black and channel black, the amount of each component being based upon 100 parts by weight of the total amount of the three components in the composition, the ratio of the melt flow rate of the polyacetyal component (a) to that of component (b) ranging from 0.5 to 15.

8. The sliding component of claim 7, wherein said carbon black component (c) in the composition is present substantially as dispersed in component (b).

9. The sliding component of claim 7, wherein said carbon black component (c) has a specific surface area of at least 400 m$^2$/g as measured by the BET method by nitrogen absorption.

10. The sliding component of claim 9, wherein said specific surface area is at least 850 m$^2$/g.

11. The sliding component of claim 7, wherein said components (a), (b) and (c) are present in amounts of from 65 to 85 parts by weight, from 10 to 25 parts by weight and from 4 to 8 parts by weight, respectively, each per 100 parts by weight of the total amounts of the three components in the composition.

12. The sliding component of claim 7, wherein component (b) is dispersed in component (a) in the form of spheres, in a fiber-like extended form or in the form of a network structure comprising fibrous particles connected to each other.

* * * * *